(12) United States Patent
Nose

(10) Patent No.: US 9,940,869 B2
(45) Date of Patent: Apr. 10, 2018

(54) INTERNAL CLOCK SIGNAL CONTROL FOR DISPLAY DEVICE, DISPLAY DRIVER AND DISPLAY DEVICE SYSTEM

(71) Applicant: Synaptics Japan GK, Tokyo (JP)

(72) Inventor: Keiji Nose, Nara (JP)

(73) Assignee: Synaptics Japan GK, Tokyo (JP)

( * ) Notice: Subject to any disclaimer, the term of this patent is extended or adjusted under 35 U.S.C. 154(b) by 192 days.

(21) Appl. No.: 15/078,217

(22) Filed: Mar. 23, 2016

(65) Prior Publication Data

US 2016/0293096 A1 Oct. 6, 2016

(30) Foreign Application Priority Data

Mar. 31, 2015 (JP) ................. 2015-073751

(51) Int. Cl.
| | |
|---|---|
| G09G 3/20 | (2006.01) |
| G09G 5/00 | (2006.01) |
| H04N 21/43 | (2011.01) |
| H04L 7/00 | (2006.01) |
| G06F 3/038 | (2013.01) |

(52) U.S. Cl.
CPC ......... *G09G 3/2096* (2013.01); *G09G 3/2092* (2013.01); *G06F 3/038* (2013.01); *G09G 5/008* (2013.01); *G09G 2330/021* (2013.01); *G09G 2370/08* (2013.01); *G09G 2370/10* (2013.01); *H04L 7/0012* (2013.01); *H04L 7/0083* (2013.01); *H04N 21/4305* (2013.01)

(58) Field of Classification Search
CPC .. G09G 5/008; H04N 21/4305; H04L 7/0012; H04L 7/0083
See application file for complete search history.

(56) References Cited

U.S. PATENT DOCUMENTS

| | | | | |
|---|---|---|---|---|
| 9,020,021 B2* | 4/2015 | Kossel | ............. | H04L 25/03343 375/229 |
| 2011/0115781 A1* | 5/2011 | Park | ..................... | G09G 3/2096 345/213 |
| 2011/0222587 A1* | 9/2011 | Chen | ...................... | H04B 1/713 375/132 |
| 2011/0286562 A1* | 11/2011 | Jeon | ......................... | G09G 3/20 375/371 |
| 2012/0182273 A1 | 7/2012 | Ninomiya et al. | | |
| 2013/0057763 A1* | 3/2013 | Cha | ........................ | G09G 5/006 348/554 |

(Continued)

Primary Examiner — Jennifer Mehmood
Assistant Examiner — Sosina Abebe
(74) Attorney, Agent, or Firm — Patterson + Sheridan, LLP

(57) ABSTRACT

A display device includes a display panel and a display driver driving the display panel. The display driver is connected to a host with a clock lane and at least one a data lane. The display driver includes: an interface circuit configured to receive an external clock signal from the host via the clock lane, receive a data signal from the host via the data lane, and output reception data transmitted over the data signal; a control circuit configured to output an internal clock signal synchronous with the external clock signal; and a drive circuitry configured to drive the display panel in response to image data included in the reception data in synchronization with the internal clock signal fed from the control circuit. The control circuit is configured to feed the internal clock signal in response to a type of a reception packet included in the reception data.

20 Claims, 4 Drawing Sheets

(56) References Cited

U.S. PATENT DOCUMENTS

| | | | |
|---|---|---|---|
| 2014/0368484 A1* | 12/2014 | Tanaka | G09G 3/3696 345/208 |
| 2015/0009200 A1* | 1/2015 | Moon | G09G 3/3233 345/212 |
| 2015/0130822 A1* | 5/2015 | Lee | G09G 3/20 345/520 |
| 2015/0130862 A1* | 5/2015 | Miyazawa | G06F 3/147 345/691 |
| 2015/0162922 A1* | 6/2015 | Song | H04L 7/0091 375/376 |
| 2016/0117978 A1* | 4/2016 | Shikata | G09G 3/2096 345/690 |

\* cited by examiner

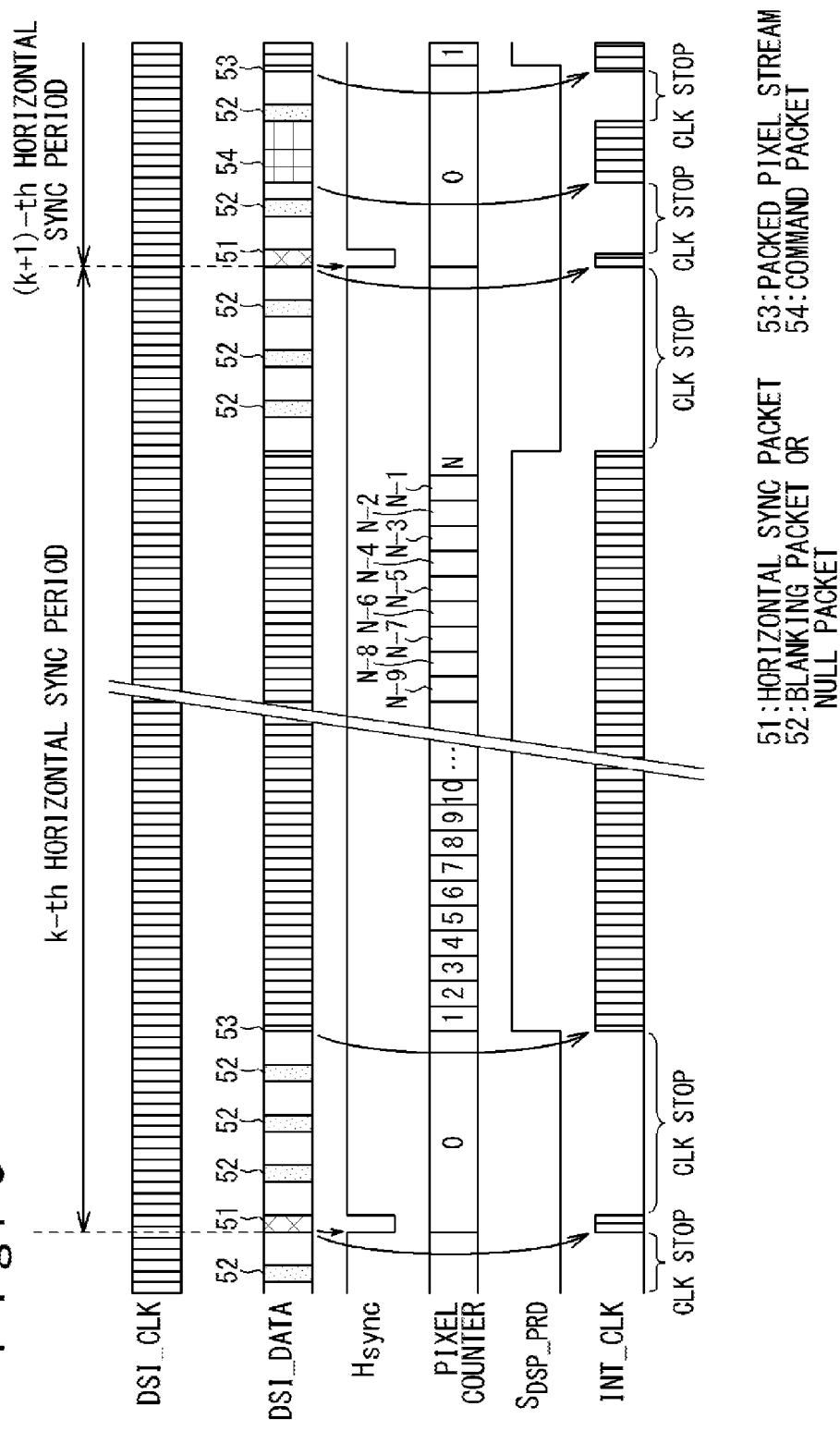

INTERNAL CLOCK SIGNAL CONTROL FOR DISPLAY DEVICE, DISPLAY DRIVER AND DISPLAY DEVICE SYSTEM

CROSS REFERENCE

This application claims priority of Japanese Patent Application No. 2015-073751 filed on Mar. 31, 2015, the disclosure which is incorporated herein by reference.

TECHNICAL FIELD

The present invention relates to a display driver, display device and display device system.

BACKGROUND ART

The MIPI-DSI (mobile industry processor interface-display serial interface), which is defined and documented by the MIPI alliance, is a standard serial interface used for communications between a processor and a peripheral device (e.g. a display device) in a portable device. The MIPI-DSI interface has a feature of high speed communication with low power consumption.

The MIPI-DSI achieves data communications with one clock lane and one to four data lanes. Each lane includes two signal lines (a pair of signal lines) that transmit a differential signal. More specifically, the clock lane includes a pair of signal lines that transmit a differential clock signal and each data lane includes a pair of signal lines that transmit a differential data signal. The MIPI-DSI specification defines two communication modes: the LP (low power) mode and the HS (high speed) mode. The LP mode is a communication mode for communications at a low speed but with reduced power consumption, whereas the HS mode is a communication mode for communications at a high speed.

The MIPI-DSI interface is often used for communications between a host (e.g. a CPU (central processing unit)) and a display driver that drives a display panel, such as a liquid crystal display panel. A large amount of data including image data are exchanged between a display driver and a host, and the MIPI-DSI interface is especially suitable for this purpose. When the MIPI-DSI interface is used for communications between a display driver and a host, image data are usually transmitted in the HS mode, because it is necessary to transmit a considerable amount of image data in each horizontal sync period, which has a limited time duration. The use of the HS mode, however, undesirably increases the power consumption of the display driver.

It should be noted that Japanese Patent Application Publication No. 2012-150152 A discloses communications based on the MIPI-DSI specification in a liquid crystal display device.

Recently, the power consumption of a display driver tends to be increased due to advanced multifunctionality, while users desire reduction in the power consumption. To meet this requirement is important especially with respect to a display driver incorporated in a portable device. There is a technical need for reducing the power consumption of a display driver.

SUMMARY OF INVENTION

Therefore, one objective of the present invention is to reduce the power consumption of a display driver. Other objectives and new features of the present invention would be understood to a person skilled in the art from the following disclosure.

In one embodiment, a display device includes a display panel and a display driver driving the display panel. The display driver is connected to a host with a clock lane and at least one data lane. The display driver includes: an interface circuit configured to receive an external clock signal from the host via the clock lane, receive a data signal from the host via the data lane, and output reception data transmitted over the data signal; a control circuit configured to output an internal clock signal synchronous with the external clock signal; and drive circuitry configured to drive the display panel in response to image data included in the reception data in synchronization with the internal clock signal outputted by the control circuit. When the clock lane and the data lane are set to a first mode, the interface circuit is configured to perform a clock recovery on the data signal transmitted over the data lane, and generate the reception data by sampling the data signal in synchronization with a recovered clock signal obtained by the clock recovery. When the clock lane and the data lane are set to a second mode, the interface circuit is configured to generate the reception data by sampling the data signal in synchronization with the external clock signal transmitted over the clock lane. The control circuit is configured to output the internal clock signal in response to a type of a reception packet included in the reception data when the clock lane and the data lane are set to the second mode.

In another embodiment, a display driver adapted to be connected to a host with a clock lane and at least one data lane is provided to drive a display panel. The display driver includes: an interface circuit configured to receive an external clock signal from the host via the clock lane, receive a data signal from the host via the data lane, and output reception data transmitted over the data signal; a control circuit configured to output an internal clock signal synchronous with the external clock signal; and a drive circuitry configured to drive the display panel in response to image data included in the reception data in synchronization with the internal clock signal outputted by the control circuit. When the clock lane and the data lane are set to a first mode, the interface circuit is configured to perform a clock recovery on the data signal transmitted over the data lane, and generate the reception data by sampling the data signal in synchronization with a recovered clock signal obtained by the clock recovery. When the clock lane and the data lane are set to a second mode, the interface circuit is configured to generate the reception data by sampling the data signal in synchronization with the external clock signal transmitted over the clock lane. The control circuit is configured to output the internal clock signal in response to a type of a reception packet included in the reception data, when the when the clock lane and the data lane are set to the second mode.

In still another embodiment, a display device system includes a host and a display device. The display device includes a display panel and a display driver driving the display panel. The display driver and the host are connected to each other with a clock lane and at least one a data lane. The display driver includes: an interface circuit configured to receive an external clock signal from the host via the clock lane, receive a data signal from the host via the data lane, and output reception data transmitted over the data signal; a control circuit configured to output an internal clock signal synchronous with the external clock signal; and a drive circuitry configured to drive the display panel in response to image data included in the reception data in synchronization with the internal clock signal outputted by the control circuit. When the clock lane and the data lane are set to a first mode, the interface circuit is configured to perform a clock recovery on the data signal transmitted over the data lane, and generate the reception data by sampling the data signal in synchronization with a recovered clock signal obtained by the clock recovery. When the clock lane and the data lane are set to a second mode, the interface circuit is configured to generate the reception data by sampling the data signal in synchronization with the external clock signal transmitted over the clock lane. The control circuit is configured to output the internal clock signal in response to a type of a reception packet included in the reception data, when the when the clock lane and the data lane are set to the second mode.

In one embodiment, the present invention effectively can reduce the power consumption of a display driver.

BRIEF DESCRIPTION OF THE DRAWINGS

The above and other advantages and features of the present invention will be more apparent from the following description taken in conjunction with the accompanied drawings, in which:

FIG. 3 is a timing chart illustrating an exemplary operation of a display driver in one embodiment.

DESCRIPTION OF PREFERRED EMBODIMENTS

The invention will be now described herein with reference to illustrative embodiments. Those skilled in the art would recognize that many alternative embodiments can be accomplished using the teachings of the present invention and that the invention is not limited to the embodiments illustrated for explanatory purposed.

Figure 1A:
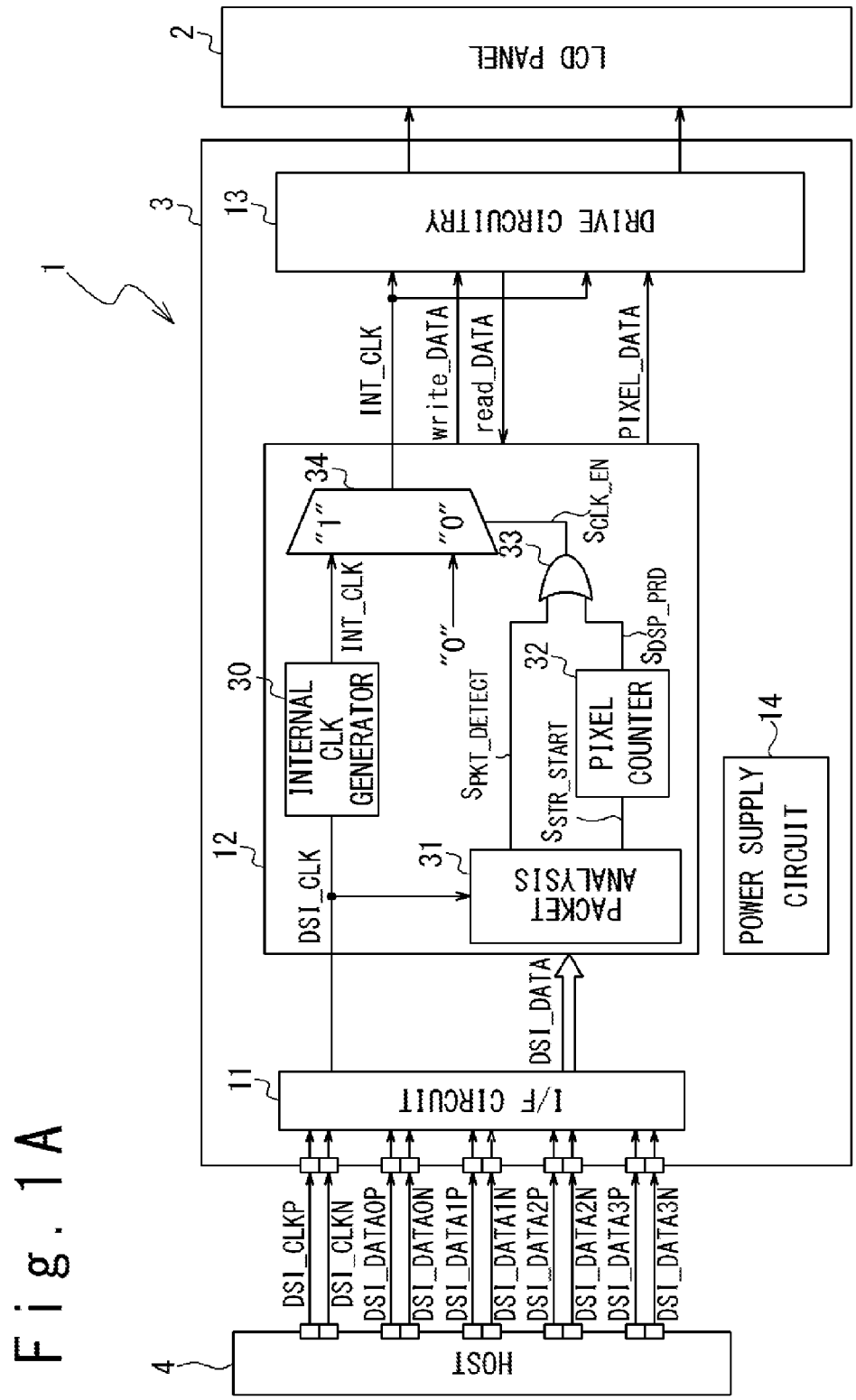
FIG. 1A is a block diagram illustrating an exemplary configuration of a display device in one embodiment.

FIG. 1A is a block diagram illustrating an exemplary configuration of a display device in one embodiment. The display device of the present embodiment is configured as a liquid crystal display device 1. A display device system, which is suitably used in a portable device, for example, is formed by the liquid crystal display device 1 and a host 4.

The liquid crystal display device 1 includes a liquid crystal display (LCD) panel 2 and a display driver 3. The liquid crystal display panel 2 includes a plurality of pixels arrayed in rows and columns, a plurality of gate lines and a plurality of source lines (note that the pixels, gate lines and source lines are not shown in FIG. 1A.) Each pixel is connected to a corresponding gate line and a corresponding source line.

The display driver 3 is communicatably connected to the host 4, and drives the liquid crystal display panel 2 in response to data received from the host 4. In the present embodiment, the MIPI-DSI interface is used for communications between the display driver 3 and the host 4. More specifically, the display driver 3 and the host 4 are connected to each other with a clock lane and four data lanes. The clock lane is used to feed (or output) a differential clock signal (an external clock signal) from the host 4 to the display driver 3 and the data lanes are each used to feed a differential data signal from the host 4 to the display driver 3. Each lane includes a pair of signal lines that transmit a differential signal. In FIG. 1A, the legends "DSI_CLKP" and "DSI_CLKN" denote a pair of signal lines that form the clock lane. The legends "DSI_DATA0P" and "DSI_DATA0N" denote a pair of signal lines that form data lane "0" and the legends "DSI_DATA1P" and "DSI_DATA1N" denote a pair of signal lines that form data lane "1". Correspondingly, the legends "DSI_DATA2P" and "DSI_DATA2N" denote a pair of signal lines that form data lane "2" and the legends "DSI_DATA3P" and "DSI_DATA3N" denote a pair of signal lines that form data lane "3". Although FIG. 1A illustrates the display device configuration in which four data lanes are provided, the number of the data lanes is not limited to four; the MIPI-DSI specification defines that there may be one to four data lanes.

The display driver 3 includes an interface circuit 11, a control circuit 12, a drive circuitry 13 and a power supply circuit 14.

The interface circuit 11 operates as a receiver that receives the differential clock signal and the differential data signals from the host 4. The interface circuit 11 is configured to support the operations defined in the MIPI-DSI specification. As described above, the MIPI-DSI specification defines the LP (low power) mode and the HS (high speed) mode. Switching between the LP mode and the HS mode can be performed individually between the clock lane and the data lanes. It should be noted however that the state in which the clock lane is set to the LP mode and the data lanes are set to the HS mode is not allowed in one embodiment. Switching between the LP mode and the HS mode is achieved by changing the voltage levels on the signal lines of the relevant lane (the clock lane or data lane) in a specific sequence. The interface circuit 11 recognizes the switching of the communication mode of each of the clock lane and data lanes on the basis of the voltage levels of the two signal lines of each of the clock lane and data lanes.

The operation of the interface circuit 11 is switched in response to the communication modes of the clock lane and the data lanes. When a data lane is placed into the LP mode, the interface circuit 11 performs a clock recovery on the differential data signal transmitted by the data lane, regardless of the communication mode (the HS mode or the LP mode) of the clock lane, and receives reception data transmitted over the differential data signal by sampling the differential data signal in synchronization with a recovered clock signal obtained by the clock recovery.

When all of the clock lane and data lanes are placed into the HS mode, on the other hand, the interface circuit 11 receives reception data transmitted over the differential data signals by sampling the differential data signals in synchronization with the differential clock signal transmitted over the clock lane. The interface circuit 11 sequentially outputs the reception data thus received. In FIG. 1A, the legend "DSI_DATA" denotes the reception data output from the interface circuit 11.

When the clock lane is set to the HS mode, the interface circuit 11 additionally generates a clock signal DSI_CLK by converting the differential clock signal into a single end signal, and outputs the generated clock signal DSI_CLK. The clock signal DSI_CLK is synchronous with the differential clock signal and has the same frequency. The frequency of the differential clock signal transmitted over the clock lane in the HS mode is higher than those of the recovered clock signals obtained by the clock recovery of the differential data signals transmitted over the data lanes, and accordingly the frequency of the clock signal DSI_CLK is also higher than those of the recovered clock signals.

The interface circuit 11 also operates as a transmitter that transmits a differential data signal from the display driver 3 to the host 4. Data lane "0", which includes the signal lines DSI_DATA0P and DSI_DATA0N, is used for transmission of the differential data signal from the display driver 3 to the host 4. When a differential data signal is transmitted from the display driver 3 to the host 4, data lane "0" is placed into the LP mode and the differential data signal is transmitted from the display driver 3 to the host 4 via data lane "0".

The control circuit 12 handles the clock signal DSI_CLK and the reception data DSI_DATA, which are received from the interface circuit 11. Schematically, the control circuit 12 operates as follows:

First, the control circuit 12 generates an internal clock signal INT_CLK from the clock signal DSI_CLK. The internal clock signal INT_CLK, which is synchronous with the clock signal DSI_CLK, is fed to various circuits that drive the liquid crystal display panel 2 as described later.

Second, the control circuit 12 analyzes reception packets included in the reception data DSI_DATA and performs various operations in accordance with the contents and types of the respective reception packets. When a reception packet is a command packet, for example, the control circuit 12 accesses control data to or from a register circuit provided in the drive circuitry 13 in response to the contents of the command packet. In FIG. 1A, control data to be written into the register circuit are denoted by the legend "write_DATA" and control data read out from the register circuit are denoted by the legend "read_DATA." When a reception packet incorporates image data, the control circuit 12 forwards the image data to the drive circuitry 13. In FIG. 1A, the image data to be forwarded to the drive circuitry 13 are denoted by the legend "PIXEL_DATA". As described later, the control circuit 12 has the function of controlling a start and stop of the output of the internal clock signal INT_CLK in response to the type of each reception packet included in the reception data DSI_DATA.

In one embodiment, the control circuit 12 includes an internal clock generator circuit 30, a packet analysis circuit 31, a pixel counter 32, an OR circuit 33 and a selector 34. It should be noted that FIG. 1A partially and schematically illustrates the configuration of the control circuit 12; the control circuit 12 may include other circuits in an actual implementation.

The internal clock generator circuit 30 generates the internal clock signal INT_CLK from the clock signal DSI_CLK. In one embodiment, the internal clock generator circuit 30 generates the internal clock signal INT_CLK through frequency dividing of the clock signal DSI_CLK.

The packet analysis circuit 31 analyzes reception packets included in the reception data DSI_DATA and performs various operations in response to the analysis results. In the present embodiment, the packet analysis circuit 31 operates as follows:

First, the packet analysis circuit 31 asserts a packet detection signal $S_{PKT\_DETECT}$ when detecting a reception packet of a specific type in the reception data DSI_DATA. In the present embodiment, the packet analysis circuit 31 asserts the packet detection signal $S_{PKT\_DETECT}$ for a given time duration when detecting a horizontal sync packet (Hsync packet) or a command packet. The horizontal sync packet is a packet indicating the start of a horizontal sync period, and the command packet is a packet incorporating a command used for the operation control of the display driver 3. It should be noted that the horizontal sync packet and the command packet are both defined in the MIPI-DSI specification. The time duration of the period during which the packet detection signal $S_{PKT\_DETECT}$ is asserted may depend on the type of the detected packet detected by the packet analysis circuit 31 and/or on the type of a command included in the detected command packet.

Second, the packet analysis circuit 31 asserts a pixel data stream start signal $S_{STR\_START}$ for a given time duration when detecting a packed pixel stream in the reception data DSI_DATA. The packed pixel stream is a packet indicating a start of transmission of image data from the host 4 to the display driver 3 (a packet that informs the display driver 3 of a start of transmission of image data from the host 4 to the display driver 3); the packed pixel stream is also defined in the MIPI-DSI specification.

The pixel counter 32 generates a display period signal $S_{DSP\_PRD}$ that indicates whether or not the current time is in an effective display period in each horizontal sync period. More specifically, in response to an assertion of the pixel data stream start signal $S_{STR\_START}$, the pixel counter 32 asserts the display period signal $S_{DSP\_PRD}$ and starts counting up the count value held therein. When the count value reaches a predetermined value, the pixel counter 32 negates the display period signal $S_{DSP\_PRD}$.

The OR circuit 33 calculates the logical sum of the packet detection signal $S_{PKT\_DETECT}$ and the pixel data stream start signal $S_{STR\_START}$ and outputs an output signal having a signal level corresponding to the calculated logical sum. The output signal of the OR circuit 33 is used as an internal clock enable signal $S_{CLK\_EN}$ that allows and prohibits the output of the internal clock signal INT_CLK from the control circuit 12. This means that the OR circuit 33 functions as a clock control circuit that generates the internal clock enable signal $S_{CLK\_EN}$ in response to the packet detection signal $S_{PKT\_DETECT}$ and the display period signal $S_{DSP\_PRD}$.

The selector 34 operates as a clock gating circuit that outputs the internal clock signal INT_CLK in response to the internal clock enable signal $S_{CLK\_EN}$. More specifically, the selector 34 outputs the internal clock signal INT_CLK when the internal clock enable signal $S_{CLK\_EN}$ is asserted, and stops the output of the internal clock signal INT_CLK when the internal clock enable signal $S_{CLK\_EN}$ is negated. When the output of the internal clock signal INT_CLK is stopped, the output of the selector 34 is set to a voltage level corresponding to a logical value "0" (e.g., the low level or the circuit ground level.)

Figure 1B:
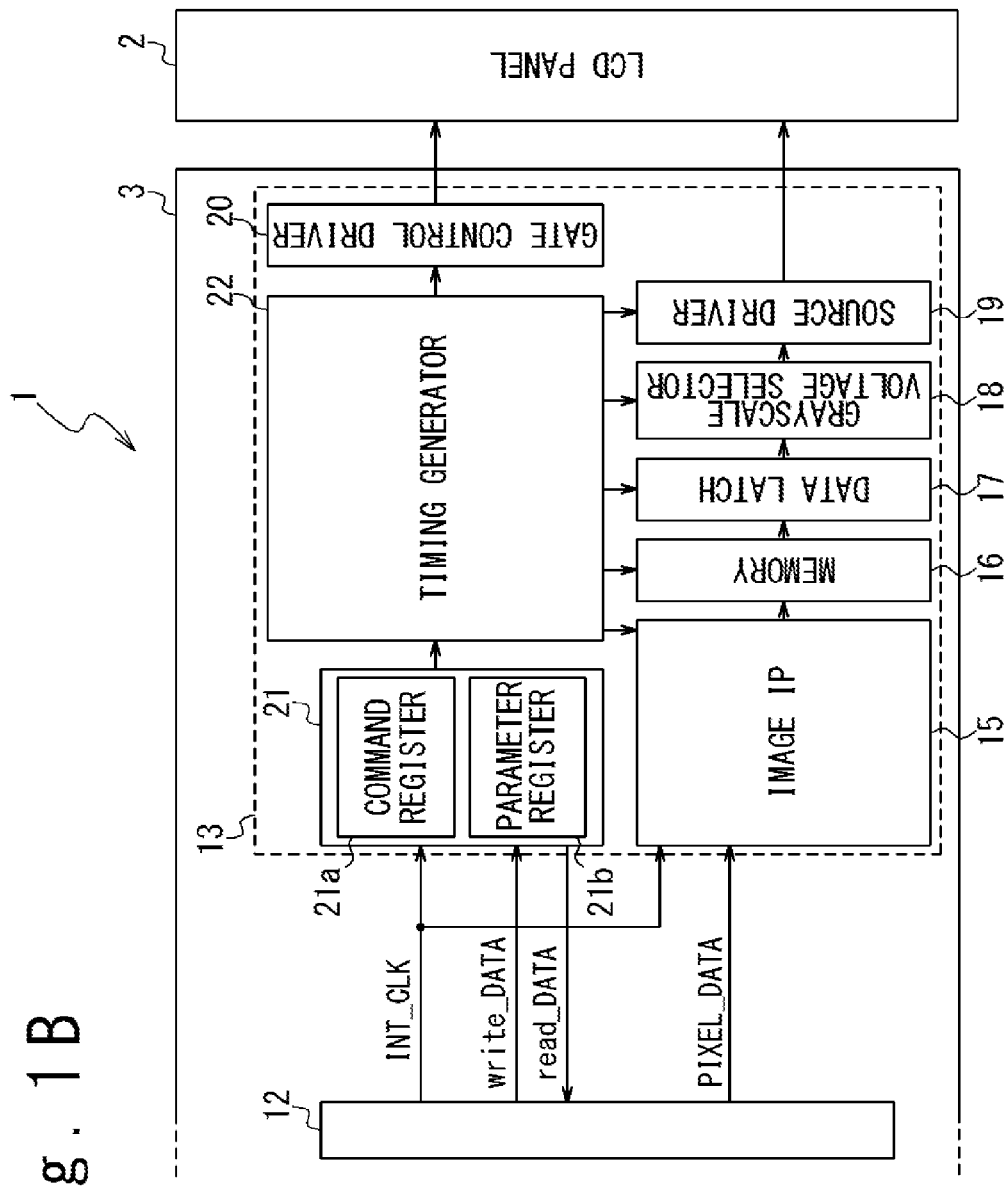
FIG. 1B is a block diagram illustrating an exemplary configuration of a drive circuitry in one embodiment.

The drive circuitry 13 operates in synchronization with the internal clock signal INT_CLK to drive the liquid crystal display panel 2 in response to the image data PIXEL_DATA received from the control circuit 12. In the present embodiment, as illustrated in FIG. 1B, the drive circuitry 13 includes an image IP (intellectual property) core 15, a memory 16, a data latch 17, a grayscale voltage selector circuit 18, a source driver circuit 19, a gate control driver 20, a register circuit 21 and a timing generator 22.

The image IP core 15 performs image processing on the image data PIXEL_DATA received from the control circuit 12 and stores the image data obtained by the image processing into the memory 16.

The memory 16 temporarily stores therein the image data received from the image IP core 15. In one embodiment, the memory 16 is configured to store image data for one frame of image. The data latch 17 latches image data from the memory 16 and forwards the latched image data to the grayscale voltage selector circuit 18. In one embodiment, the data latch 17 is configured to latch image data associated with one horizontal line of pixels of the liquid crystal display panel 2 (that is, pixels connected to one gate line) at the same time. The grayscale voltage selector circuit 18 selects grayscale voltages corresponding to the image data received from the data latch 17 and feeds the selected grayscale voltages to the source driver circuit 19. The source driver circuit 19 receives grayscale voltages associated with the respective source lines of the liquid crystal display panel 2 from the grayscale voltage selector circuit 18. The source driver circuit 19 drives the respective source lines of the liquid crystal display panel 2 to the voltages corresponding to the grayscale voltages received from the grayscale voltage selector circuit 18.

The gate control driver 20 drives the gate lines of the liquid crystal display panel 2. Alternatively, when a gate driver circuit that drives the gate lines is integrated in the liquid crystal display panel 2 (a gate driver circuit of this sort is often referred to as GIP (gate-in-panel) circuit), the gate control driver 20 may feed control signals that control the gate driver circuit, to the liquid crystal display panel 2.

The register circuit 21 and the timing generator 22 form a control circuitry that operates in synchronization with the internal clock signal INT_CLK to control the image IP core 15, the memory 16, the data latch 17, the grayscale voltage selector circuit 18, the source driver circuit 19 and the gate control driver 20. More specifically, the register circuit 21 includes a command register 21a and a parameter register 21b. The command register 21a stores commands used for control of the operation of the display driver 3 and the parameter register 21b stores various parameters used for control of the operation of the display driver 3. The timing generator 22 controls operation timing of the respective circuits of the display driver 3 (e.g., the image IP core 15, the memory 16, the data latch 17, the grayscale voltage selector circuit 18, the source driver circuit 19 and the gate control driver 20) in response to the commands stored in the command register 21a and the parameters stored in the parameter register 21b.

The power supply circuit 14 generates various power supply voltages used for the operations of the respective circuits of the display driver 3, from an externally-supplied power supply voltage and feeds the generated power supply voltages to the respective circuits.

In the following, a description is given of an overview of the operation of the display driver 3 configured as described above.

In the present embodiment, the display driver 3 is configured to stop the outputting of the internal clock signal INT_CLK to the drive circuitry 13 in a period during which outputting the internal clock signal INT_CLK to the drive circuitry 13 is not required in each horizontal period. When outputting the internal clock signal INT_CLK to the drive circuitry 13 is stopped, the operation of the drive circuitry 13 is stopped and the voltage levels on the respective nodes of the clock tree (which includes signal lines and clock buffers) are fixed. This operation effectively reduces the power consumption of the display driver 3.

Figure 2:
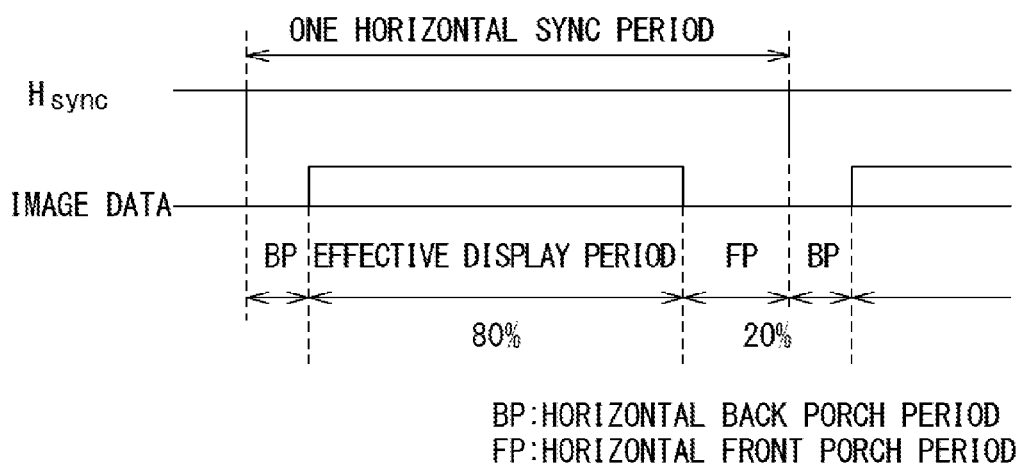
FIG. 2 is a timing chart illustrating an exemplary operation of a typical liquid crystal display device in each horizontal sync period.

More specifically, as illustrated in FIG. 2, each horizontal sync period includes three periods: a horizontal back porch period (BP), an effective display period and a horizontal front porch period (FP) as is the case with a generally-used display device. During the effective display period, in which image data are fed to the drive circuitry 13, the internal clock signal INT_CLK is fed to the drive circuitry 13. In this case, the drive circuitry 13 operates in synchronization with the internal clock signal INT_CLK. For example, the image IP core 15 of the drive circuitry 13 receives image data from the control circuit 12 in synchronization with the internal clock signal INT_CLK, and the memory 16 operates in synchronization with the internal clock signal INT_CLK to store therein the image data received from the image IP core 15.

In the horizontal back porch period and the horizontal front porch period, on the other hand, it is basically unnecessary to output the internal clock signal INT_CLK to the drive circuitry 13, since the drive circuitry 13 does not need to process the image data in these periods. In general, the horizontal back porch period and horizontal front porch period occupy 20% of the time duration of each horizontal sync period and therefore a considerable reduction in the power consumption is expected if the feeding of the internal clock signal INT_CLK to the drive circuitry 13 is stopped in the horizontal back porch period and horizontal front porch period.

It should be noted however that there may arise a necessity of outputting the internal clock signal INT_CLK to the drive circuitry 13 in the horizontal back period or the horizontal front porch period, depending on the type of a packet included in the reception data DSI_DATA received by the control circuit 12. When the control circuit 12 receives a command packet as the reception data DSI_DATA, for example, it is necessary for the drive circuitry 13 to store the command specified by the command packet into the command register 21a of the register circuit 21 of the drive circuitry 13 and to perform the operation specified by the command. In this case, the internal clock signal INT_CLK should be fed to the drive circuitry 13 also in the horizontal back porch period or the horizontal front porch period.

On the basis of the above-described technical idea, in the present embodiment, the display driver 3 is configured to determine the necessity of feeding the internal clock signal INT_CLK to the drive circuitry 13 at each time point in each horizontal sync period, depending on the type of a reception packet included in the reception data DSI_DATA. In the present embodiment, the control circuit 12 of the display driver 3 is configured to feed the internal clock signal INT_CLK to the drive circuitry 13, when detecting any of (1) a horizontal sync packet (Hsync packet), (2) a command packet and (3) a packed packet stream in the reception data DSI_DATA which are sequentially received by the control circuit 12. As described above, the horizontal sync packet is a packet indicating the start of a horizontal sync period, and the command packet is a packet incorporating a command used for the operation control of the display driver 3. The packet pixel stream is a packet that notifies the display driver 3 that image data are going to be transmitted from the host 4 to the display driver 3 from now on.

More specifically, the control circuit 12 operates as follows:

When detecting a horizontal sync packet or a command packet in the reception data DSI_DATA, the control circuit 12 feeds the internal clock signal INT_CLK to the drive circuitry 13 for a given time duration and then stops the feeding of the internal clock signal INT_CLK. The length of the time duration during which the internal clock signal INT_CLK is fed may be determined depending on the type of packet (horizontal sync packet or command packet) and/or on the type of command included in the command packet.

In detail, when detecting a horizontal sync packet or a command packet in the reception data DSI_DATA, the packet analysis circuit 31 of the control circuit 12 asserts the packet detection signal $S_{PKT\_DETECT}$ for a given time duration. When the packet detection signal $S_{PKT\_DETECT}$ is asserted, the internal clock enable signal $S_{CLK\_EN}$, which is output from the OR circuit 33, is asserted and the selector 34 starts outputting the internal clock signal INT_CLK. When the packet detection signal $S_{PKT\_DETECT}$ is then negated, the internal clock enable signal $S_{CLK\_EN}$ is negated and accordingly the selector 34 stops outputting the internal clock signal INT_CLK. The above-described operations of the respective circuits in the control circuit 12 effectively achieves the operation in which the internal clock signal INT_CLK is fed to the drive circuitry 13 for a given time duration upon detection of a horizontal sync packet or a command packet in the reception data DSI_DATA and then the feeding of the internal clock signal INT_CLK is stopped.

When detecting a packed pixel stream in the reception data DSI_DATA, on the other hand, the control circuit 12 feeds the internal clock signal INT_CLK to the drive circuitry 13 for a time duration corresponding to the time length of the effective display period, and then stops the feeding of the internal clock signal INT_CLK.

In detail, when detecting a packed pixel stream in the reception data DSI_DATA, the packet analysis circuit 31 of the control circuit 12 asserts the pixel data stream start signal $S_{STR\_START}$ for a given time duration. In response to the assertion of the pixel data stream start signal $S_{STR\_START}$, the pixel counter 32 asserts the display period signal $S_{DSP\_PRD}$ and also starts counting. When the display period signal $S_{DSP\_PRD}$ is asserted, the internal clock enable signal $S_{CLK\_EN}$, which is output from the OR circuit 33, is asserted and the selector 34 starts outputting the internal clock signal INT_CLK. In the meantime, the count value held by the pixel counter 32 is incremented. Note that the pixel counter 32 is reset at the beginning of each horizontal sync period. When the count value then reaches a predetermined value, the pixel counter 32 negates the display period signal $S_{DSP\_PRD}$. The predetermined value is adjusted so that the period during which the display period signal $S_{DSP\_PRD}$ is asserted (that is, the period during which the internal clock signal INT_CLK is fed to the drive circuitry 13) has a time length corresponding to that of the effective display period (for example, the same time length as the effective display period.) When the packet detection signal $S_{PKT\_DETECT}$ is negated, the internal clock enable signal $S_{CLK\_EN}$ is negated and the selector 34 stops outputting the internal clock signal INT_CLK. The above-described operations of the respective circuits in the control circuit 12 effectively achieves the operation in which the internal clock signal INT_CLK is fed to the drive circuitry 13 for a time duration corresponding to that of the effective display period upon detection of a packed pixel stream in the reception data DSI_DATA and then the feeding of the internal clock signal INT_CLK is stopped.

The type of packet for which the internal clock signal INT_CLK is fed to the drive circuitry 13 upon detection thereof in the reception data DSI_DATA may be determined depending on the design of the display driver 3.

FIG. 3 is a timing chart illustrating an example of the display driver 3 in the present embodiment. FIG. 3 illustrates an exemplary operation of the display driver 3 in the k-th horizontal sync period and a part of the (k+1)-th horizontal sync. In each horizontal sync period, communications from the host 4 to the display driver 3 is performed in the HS mode. This implies that the clock lane and the data lanes are set to the HS mode in the entirety of each horizontal sync period. Accordingly, during each horizontal sync period, the differential clock signal is continuously fed to the display driver 3 from the host 4 via the clock lane and the clock signal DSI_CLK is continuously fed from the interface circuit 11 to the control circuit 12. This is because the time length of each horizontal sync period is limited and therefore a sufficient time for switching the operation mode between the HS mode and LP mode cannot be defined in each horizontal sync period.

When communications from the host 4 to the display driver 3 are implemented in the HS mode, this may undesirably increase the power consumption. In the display driver 3 of this embodiment, however, the power consumption of the display driver 3 is effectively reduced by performing the operation described in the following:

At the beginning of each horizontal sync period, the host 4 transmits to the display driver 3 a horizontal sync packet with a differential data signal transmitted over a data lane. When detecting a horizontal sync packet 51 in the reception data DSI_DATA obtained from the differential data signal, the control circuit 12 of the display driver 3 asserts a horizontal sync signal Hsync and feeds the internal clock signal INT_CLK to the drive circuitry 13 for a given time duration. This allows the drive circuitry 13 to perform operations to be done just after the start of the horizontal sync period in synchronization with the internal clock signal INT_CLK. Note that the horizontal sync signal Hsync is illustrated as a low-active signal in FIG. 3.

Even when the host 4 transmits a blanking packet or a null packet to the display driver 3 in the following horizontal back porch period, the control circuit 12 does not start feeding the internal clock signal INT_CLK to the drive circuitry 13. This is because the blanking packet and the null packet are not related to the operation of the drive circuitry 13. Note that the blanking packet and the null packet are defined in the MIPI-DSI specification; the MIPI-DSI specification defines that blanking packets and null packets are to be transmitted to the receiving side at given intervals. In FIG. 3, the blanking packets and null packets are denoted by the numerals "52" and the operation of the display driver 3 is illustrated in the case that three blanking or null packets 52 are transmitted in the horizontal back porch period of the k-th horizontal sync period.

When the host 4 is then going to start transmitting image data to the display driver 3, the host 4 transmits a packed pixel stream to the display driver 3 with a differential data signal transmitted over a data lane. When detecting a packed pixel stream 53 in the reception data DSI_DATA obtained from the differential data signal, the control circuit 12 of the display driver 3 feeds the internal clock signal INT_CLK to the drive circuitry 13 for the time duration corresponding to that of the effective display period. The control circuit 12 then forwards to the drive circuitry 13 image data transmitted from the host 4 after the transmission of the packed pixel stream 53. In the drive circuitry 13, image processing is performed on the forwarded image data by the image IP core 15 and the image data obtained by image processing are stored in the memory 16. In the meantime, the source lines of the liquid crystal display panel 2 are driven in response to the image data read out from the memory 16. The above-described operation of the drive circuitry 13 is performed in synchronization with the internal clock signal INT_CLK.

When the effective display period has expired, the control circuit 12 stops the feeding of the internal clock signal INT_CLK to the drive circuitry 13.

Even when the host 4 transmits a blanking packet or a null packet to the display driver 3 in the following horizontal front porch period, the control circuit 12 does not start feeding the internal clock signal INT_CLK to the drive circuitry 13. In FIG. 3, the operation of the display driver 3 is illustrated in the case that three blanking or null packets, which are denoted by numeral 52, are transmitted to the display driver 3 in the horizontal front porch period of the k-th horizontal sync period.

When the host 4 transmits a command packet 54 to the display driver 3 in the horizontal back porch period or a horizontal front porch period, the control circuit 12 feeds the internal clock signal INT_CLK to the drive circuitry 13 for a given time duration upon detection of the command packet 54, and then stops the feeding of the internal clock signal INT_CLK. In FIG. 3, the operation of the display driver 3 is illustrated in the case that a command packet 54 is transmitted in the horizontal back porch period of the (k+1)-th horizontal sync period. This allows the drive circuitry 13 to perform the operation specified by the command incorporated in the command packet 54 in synchronization with the internal clock signal INT_CLK.

Although various embodiments are specifically described in the above, the present invention must not be construed as being limited to the above-described embodiments; it would be apparent to a person skilled in the art that the present invention may be implemented with various modifications. For example, although the above-described embodiments recite implementations of the present invention in a liquid crystal display device including a liquid crystal display panel, the present invention may be applicable to a display device including a different type of display panel (e.g., an OLED (organic light emitting diode) display panel).

Although the above-described embodiments recite implementations in which the MIPI-DSI interface is used in communications between the display driver 3 and the host 4, the present invention may be applicable to a display device system which uses a communication protocol similar to MIPI-DSI for communications between a display drive and a host. For example, the present invention is generally applicable to a display device system which uses a communication protocol defined so that, (1) when a clock lane and a data lane are set a first mode, the display driver performs a clock recovery on a data signal transmitted over the data lane, and receives reception data transmitted over the data signal by sampling the data signal in synchronization with a clock signal obtained by the clock recovery, and (2) when the clock lane and the data lane are set to a second mode, the display driver receives reception data transmitted over a data signal by sampling the data signal in synchronization with an external clock signal transmitted over the clock lane.

What is claimed is:
1. A display device, comprising:
a display panel; and
a display driver driving the display panel,
wherein the display driver is connected to a host with a clock lane and at least one data lane,
wherein the display driver comprises:
an interface circuit configured to receive an external clock signal from the host via the clock lane, receive a data signal from the host via the data lane, and output reception data transmitted over the data signal;
a control circuit configured to output an internal clock signal synchronous with the external clock signal; and
drive circuitry configured to drive the display panel in response to image data included in the reception data in synchronization with the internal clock signal outputted by the control circuit, wherein, when the clock lane and the data lane are set to a first mode, the interface circuit is configured to perform a clock recovery on the data signal transmitted over the data lane and generate the reception data by sampling the data signal in synchronization with a recovered clock signal obtained by the clock recovery,
wherein, when the clock lane and the data lane are set to a second mode, the interface circuit is configured to generate the reception data by sampling the data signal in synchronization with the external clock signal transmitted over the clock lane, and
wherein the control circuit is configured to output the internal clock signal in response to a type of a reception packet included in the reception data when the clock lane and the data lane are set to the second mode.

2. The display device according to claim 1, wherein the control circuit comprises a pixel counter, and
wherein the control circuit is configured to, when detecting a first packet in the reception data, start outputting the internal clock signal, start counting using the pixel counter, and stop the output of the internal clock signal in response to a count value of the pixel counter reaching a predetermined value, the first packet indicating a start of transmitting the image data from the host to the display driver.

3. The display device according to claim 1, wherein the control circuit is configured to, when detecting a reception packet of a specific type in the reception data received from the interface circuit, output the internal clock signal to the drive circuitry for a given time duration.

4. The display device according to claim 1, wherein the control circuit is configured to, when detecting a second packet in the reception data received from the interface circuit, output the internal clock signal to the drive circuitry for a given time duration, the second packet indicating a start of a horizontal sync period.

5. The display device according to claim 1, wherein the control circuit is configured to, when detecting a third packet in the reception data received from the interface circuit, output the internal clock signal to the drive circuitry for a given time duration, the third packet incorporating a command.

6. The display device according to claim 1, wherein the mobile industry processor interface-display serial interface (MIPI-DSI) is used to communicate between the display driver and the host,
wherein the first mode is the low power (LP) mode, and
wherein the second mode is the high speed (HP) mode.

7. A display driver to be connected to a host with a clock lane and at least one data lane to drive a display panel, the driver comprising:
an interface circuit configured to receive an external clock signal from the host via the clock lane, receive a data signal from the host via the data lane, and output reception data transmitted over the data signal;
a control circuit configured to output an internal clock signal synchronous with the external clock signal; and
a drive circuitry configured to drive the display panel in response to image data included in the reception data in synchronization with the internal clock signal outputted by the control circuit,
wherein, when the clock lane and the data lane are set to a first mode, the interface circuit is configured to perform a clock recovery on the data signal transmitted over the data lane, and generate the reception data by sampling the data signal in synchronization with a recovered clock signal obtained by the clock recovery, wherein, when the clock lane and the data lane are set to a second mode, the interface circuit is configured to generate the reception data by sampling the data signal in synchronization with the external clock signal transmitted over the clock lane, and wherein the control circuit is configured to output the internal clock signal in response to a type of a reception packet included in the reception data, when the when the clock lane and the data lane are set to the second mode.

8. The display driver according to claim 7, wherein the control circuit comprises a pixel counter, and wherein the control circuit is configured to, when detecting a first packet in the reception data, start outputting the internal clock signal, start counting using the pixel counter, and stop the output of the internal clock signal in response to a count value of the pixel counter reaching a predetermined value, the first packet indicating a start of transmitting the image data from the host to the display driver.

9. The display driver according to claim 7, wherein the control circuit is configured to, when detecting a reception packet of a specific type in the reception data received from the interface circuit, output the internal clock signal to the drive circuitry for a given time duration.

10. The display driver according to claim 7, wherein the control circuit is configured to, when detecting a second packet in the reception data received from the interface circuit, output the internal clock signal to the drive circuitry for a given time duration, the second packet indicating a start of a horizontal sync period.

11. The display driver according to claim 7, wherein the control circuit is configured to, when detecting a third packet in the reception data received from the interface circuit, output the internal clock signal to the drive circuitry for a given time duration, the third packet incorporating a command.

12. The display driver according to claim 7, wherein the mobile industry processor interface-display serial interface (MIPI-DSI) is used to communicate between the display driver and the host, wherein the first mode is the low power (LP) mode, and wherein the second mode is the high speed (HP) mode.

13. A display device system, comprising:
a host; and
a display device including:
a display panel; and
a display driver driving the display panel,
wherein the display driver and the host are connected to each other with a clock lane and at least one a data lane,
wherein the display driver comprises:
an interface circuit configured to receive an external clock signal from the host via the clock lane, receive a data signal from the host via the data lane, and output reception data transmitted over the data signal;
a control circuit configured to output an internal clock signal synchronous with the external clock signal; and
a drive circuitry configured to drive the display panel in response to image data included in the reception data in synchronization with the internal clock signal outputted by the control circuit, wherein, when the clock lane and the data lane are set to a first mode, the interface circuit is configured to perform a clock recovery on the data signal transmitted over the data lane, and generate the reception data by sampling the data signal in synchronization with a recovered clock signal obtained by the clock recovery, wherein, when the clock lane and the data lane are set to a second mode, the interface circuit is configured to generate the reception data by sampling the data signal in synchronization with the external clock signal transmitted over the clock lane, and wherein the control circuit is configured to output the internal clock signal in response to a type of a reception packet included in the reception data, when the when the clock lane and the data lane are set to the second mode.

14. The display device system according to claim 13, wherein the clock lane and the data lane are set to the second mode during the entirety of each horizontal sync period.

15. The display device system according to claim 13, wherein the mobile industry processor interface-display serial interface (MIPI-DSI) is used to communicate between the display driver and the host, wherein the first mode is the low power (LP) mode, and wherein the second mode is the high speed (HP) mode.

16. The display device system according to claim 13, wherein the control circuit is configured to, when detecting a reception packet of a specific type in the reception data received from the interface circuit, output the internal clock signal to the drive circuitry for a given time duration.

17. The display device system according to claim 13, wherein the control circuit comprises a pixel counter, and wherein the control circuit is configured to, when detecting a first packet in the reception data, start outputting the internal clock signal, start counting using the pixel counter, and stop the output of the internal clock signal in response to a count value of the pixel counter reaching a predetermined value, the first packet indicating a start of transmitting the image data from the host to the display driver.

18. The display device system according to claim 13, wherein the control circuit is configured to, when detecting a second packet in the reception data received from the interface circuit, output the internal clock signal to the drive circuitry for a given time duration, the second packet indicating a start of a horizontal sync period.

19. The display device system according to claim 13, wherein the control circuit is configured to, when detecting a third packet in the reception data received from the interface circuit, output the internal clock signal to the drive circuitry for a given time duration, the third packet incorporating a command.

20. The display device system according to claim 13, wherein the control circuit is configured to output the internal clock signal to the drive circuitry when detecting at least one of a horizontal sync packet, a command packet, and a packed packet stream.

* * * * *